(12) United States Patent
Papageorgiou et al.

(10) Patent No.: US 10,805,426 B2
(45) Date of Patent: Oct. 13, 2020

(54) METHOD AND SYSTEM FOR SUPPORTING DATA UPLOAD FROM A MOBILE GATEWAY DEVICE TO A BACKEND ENTITY

(71) Applicant: NEC Laboratories Europe GmbH, Heidelberg (DE)

(72) Inventors: Apostolos Papageorgiou, Barcelona (ES); Miguel Garcia Galvao Almeida, Ettlingen (DE); Ernoe Kovacs, Stuttgart (DE)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 16/095,941

(22) PCT Filed: Apr. 26, 2016

(86) PCT No.: PCT/EP2016/059317
§ 371 (c)(1),
(2) Date: Oct. 24, 2018

(87) PCT Pub. No.: WO2017/186277
PCT Pub. Date: Nov. 2, 2017

(65) Prior Publication Data
US 2019/0158625 A1    May 23, 2019

(51) Int. Cl.
*H04L 12/26*   (2006.01)
*H04L 12/66*   (2006.01)
(Continued)

(52) U.S. Cl.
CPC ............ *H04L 67/325* (2013.01); *H04L 12/66* (2013.01); *H04L 43/0811* (2013.01);
(Continued)

(58) Field of Classification Search
None
See application file for complete search history.

(56) References Cited

U.S. PATENT DOCUMENTS

2007/0259670 A1* 11/2007 Sakhpara ............... H04W 24/00
                                                            455/452.2
2009/0063187 A1*  3/2009 Johnson ................ H04W 4/029
                                                            705/2
(Continued)

*Primary Examiner* — Joshua Joo
(74) *Attorney, Agent, or Firm* — Leydig, Voit & Mayer, Ltd.

(57) ABSTRACT

A method for supporting data upload, performed according to an upload schedule, from a mobile gateway device to a backend, includes: reporting, by gateway devices, connectivity information of the gateway devices to a connectivity registry; computing, by the connectivity registry, connectivity patterns based on the connectivity information; retrieving, by a mobile gateway device, one or more of the connectivity patterns for one or more channels for use by the mobile gateway device, based on location information of the mobile gateway device, the retrieved connectivity patterns being selected from the connectivity patterns computed by the connectivity registry; and determining, by the mobile gateway device, a preemptive upload schedule for uploading data from the mobile gateway device to the backend such that the preemptive upload schedule is adjusted based on the retrieved connectivity patterns.

20 Claims, 5 Drawing Sheets

(51) Int. Cl.
*H04W 4/02* (2018.01)
*H04L 29/08* (2006.01)
*H04W 4/029* (2018.01)
*H04W 4/70* (2018.01)

(52) U.S. Cl.
CPC .............. *H04L 67/12* (2013.01); *H04L 67/18* (2013.01); *H04L 67/2857* (2013.01); *H04L 67/32* (2013.01); *H04W 4/02* (2013.01); *H04W 4/027* (2013.01); *H04W 4/029* (2018.02); *H04W 4/70* (2018.02)

(56) References Cited

U.S. PATENT DOCUMENTS

2011/0310867 A1* 12/2011 Kennedy ............ G01C 21/3461
                                                                                     370/338
2014/0313908 A1   10/2014 Da Silva et al.
2014/0347984 A1* 11/2014 Speks ................. H04L 41/0896
                                                                                     370/230
2017/0149624 A1*  5/2017 Chitti ...................... H04L 41/50
2017/0176192 A1*  6/2017 Cardoso de Moura .......................
                                                                                     G01C 21/3461
2018/0332139 A1* 11/2018 Gibbon ................. H04W 4/029

* cited by examiner

```
/*
   Input:
      probabilityThreshold:  Configuration parameter indicating the minimum
            probability that a connectivity pattern must have in order to be considered
      badChannelsThreshold: The amount of expected bad connectivity situations above
            which the GW should increase its upload intervals
      planningHorizon:   The upcoming period for which the GW wants to create a
            schedule
   Output:
      preemptivePolicy: A structure containing information about the decided upload
            intervals of periodic uploads and the timestamps of non-periodic scheduled
            uploads.
*/
----------------
ConnectivityPattern[] relevantConnectivityPatterns = null; // initialization of a
   //table (see structure definition below) for storing information about connectivity
   //patterns that will determine the schedule
Geofence gf = null; // initialization of a structure (see definition below) for
   //storing information about the area in which this gateway will look for
   //connectivity patterns if (GW.programmedTrajectory != null) // if the GW knows its future locations exactly
   gf = GW.programmedTrajectory;
else
   gf = getFutureGWLocations(planningHorizon,GW.loc,GW.speed,GW.dir);
end if                                                                          ← 6 relevantConnectivityPatterns =
   ConnectivityRegistry.getCPEntriesByArea(gf,planningHorizon);

if (relevantConnectivityPatterns.size > badChannelsThreshold)
   preemptivePolicy.increasePeriodicUploadInterval();
   preemptivePolicy.setUploadOnlyHighPriorityDataItems(true);
end if                                                                          ← 7 for (cp : relevantConnectivityPatterns)
   if (gf.getProbabilityOfArea(cp.area)*cp.confidenceLevel > probabilityThreshold)
      preemptivePolicy.addScheduledUpload(gf.getTimeOfEnteringArea(cp.area));
   end if
end for return preemptivePolicy;

---------------- subfunction getFutureGWLocations {... // a movement prediction method, which computes
   //the future locations of an object based on current location, direction, and speed,
   //and returns the result in the form of a Geofence.
}

Def struct ConnectivityPattern {
   GeoArea area,  // e.g., defined by geoLocation, i.e., coordinates pair, and radius
   ...,
   int qualityLevel,    // channel quality indicator
   int confidenceLevel; // probability that this quality will still exist in this area
                        // in the future
}

Def struct Geofence {
   Vector xCoord,  // coordinates defining the area of the geofence
   Vector yCoord,  // coordinates defining the area of the geofence
   ...,
   function getTimeOfEnteringArea(GeoArea a), // ...when a given area will be entered
   function getProbabilityOfArea(GeoArea a);  // probability of the above
}
```

METHOD AND SYSTEM FOR SUPPORTING DATA UPLOAD FROM A MOBILE GATEWAY DEVICE TO A BACKEND ENTITY

CROSS-REFERENCE TO PRIOR APPLICATIONS

This application is a U.S. National Stage Application under 35 U.S.C. § 371 of International Application No. PCT/EP2016/059317 filed on Apr. 26, 2016. The International Application was published in English on Nov. 2, 2017 as WO 2017/186277 A1 under PCT Article 21(2).

FIELD

The present invention relates to a method and system for supporting data upload from a mobile gateway device to a backend entity.

BACKGROUND

In recent years the expansion of the Internet of Things (IoT) and the huge increase of sources which feed IoT with data which is collected and/or generated at the edge of the network—i.e. for instance by end users, at sensors, or from any other IoT-connected devices—have generated a considerable challenge, which may be characterized as a reverse Content Delivery Network (CDN).

Research in the field of Content Delivery Networks (CDNs) has tried to optimize data delivery from the network core to the network edge, whereas this reverse CDN landscape requires an optimization of the data delivery from the network edge to the network core. This comes with a new set of challenges and opportunities such as the creation of data upload schedules, closed loops at the edge, early data filtering, on-site analytics, and more. The problem is usually to reduce latency or computing load, network traffic load and/or storage load.

The aforementioned challenges of the reverse CDN landscape have additional special requirements and features when the entities which collect and/or generate the data at the edge of the network and which forward it to the core of the network are highly mobile IoT gateway devices, e.g., gateways (GWs) in cars, trains, or drones.

SUMMARY

An embodiment of the present invention provides a method for supporting data upload from a mobile gateway device to a backend, the data upload being performed according to an upload schedule, that includes: reporting, by gateway devices, connectivity information of the gateway devices to a connectivity registry; computing, by the connectivity registry, connectivity patterns based on the connectivity information; retrieving, by a mobile gateway device of the mobile gateway devices, one or more of the connectivity patterns for one or more channels that are configured to be used by the mobile gateway device, based on location information of the mobile gateway device, the one or more connectivity patterns retrieved by the mobile gateway device being selected from the connectivity patterns computed by the connectivity registry; and determining, by the mobile gateway device, a preemptive upload schedule for uploading data from the mobile gateway device to the backend such that the preemptive upload schedule is adjusted based on the one or more connectivity patterns retrieved by the mobile gateway device from the connectivity registry.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 is a pseudocode listing of an example of a computation algorithm for a method and a system according to an embodiment of the present invention, where the computation algorithm computes a preemptive upload schedule.

DETAILED DESCRIPTION

Figure 1:
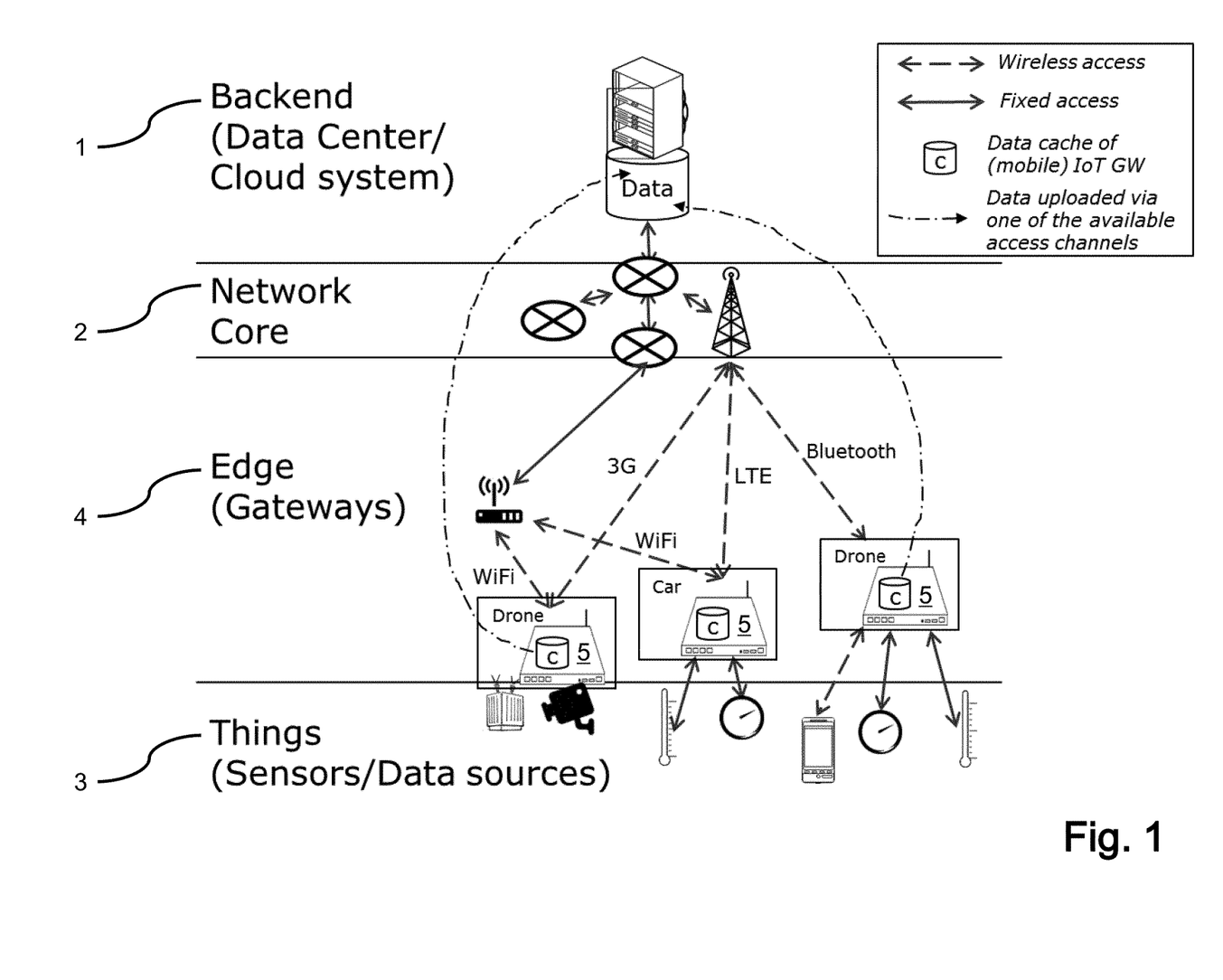
FIG. 1 is a schematic view illustrating an application scenario in the field of the Internet of Things (IoT) for a method and a system according to an embodiment of the present invention.

FIG. 1 shows an application scenario in the field of the Internet of Things (IoT), where connectivity and data uploads of highly mobile Internet of Things (IoT) gateway (GW) devices are illustrated.

As depicted in FIG. 1, the function of such gateway devices may be characterized by the following:

i) Multiple options with varying quality for their connectivity to the backend
ii) High-speed mobility and frequently interrupted connectivity
iii) Handling of big volumes of potential critical data For the gateway devices, data upload schedules are an alternative to an immediate uploading/forwarding of the data that they generate, capture, monitor, and/or collect from devices that are connected to them. When no real-time requirements exist, it is often preferred to cache the data for longer periods—e.g. several seconds, or even minutes or hours—and upload the entire cache content at once, usually periodically. Depending on the underlying system and the use case, this can have advantages such as fair or more efficient bandwidth usage, reduction of open connections to backend systems, and more.

With regard to creating efficient data uploading schedules, various methods and systems are known for the case where smartphones act as gateways for data that they collect from sensors or from their users. Thus, systems have been developed to increase the efficiency of data upload schedules of smartphones, which could be used or adapted for mobile IoT gateways.

For example, the non-patent literature of Moo-Ryong Ra, Jeongyeup Paek, Abhishek B. Sharma, Ramesh Govindan, Martin H. Krieger and Michael J. Neely: "*Energy-delay tradeoffs in smartphone applications*", 8th international conference on Mobile systems, applications, and services (*MobiSys* '10), *ACM* 2010, pp. 255-270, DOI=http://dx.doi.org/10.1145/1814433.1814459 describes an online algorithm for delaying data transfers until lower-energy connections become available.

The non-patent literature of A. Y. Ding, Bo Han, Yu Xiao, Pan Hui, A. Srinivasan, M. Kojo, S. Tarkoma: "*Enabling energy-aware collaborative mobile data offloading for smartphones*", 10*th Annual IEEE Communications Society Conference on Sensor, Mesh and Ad Hoc Communications and Networks* (*SECON*), 2013, pp. 487-495, DOI: 10.1109/SAHCN.2013.6645020 describes a collaborative approach with a similar goal, namely an approach in which smartphones, WiFi access points and proxies collaborate for optimizing data offloading from smartphones to a server with regard to energy consumption.

However, these known approaches are disadvantageous, because they are not able to solve problems as follows:

Uploads which could and should have been performed on time might be delayed, because the mentioned approaches might schedule or delay an upload into a period of long connectivity interruption. Then, the upload will have to wait until the end of the interruption, which may be unacceptable for the application that is using the data.

"Just good" connections might be used for uploading big data volumes although better ones would be available soon afterwards. Depending on the network, this might overload the channels and thus hinder other gateways, which will have no connectivity later, from uploading their data, or it might just lead to very long uploading times, which lead to suboptimal use of database connection pools, gateway CPU and energy consumption, and more.

In view of the above, the present invention improves and further develops a method and a system for supporting data upload from a mobile gateway device to a backend entity in such a way that an improved data uploading with regard to efficiency and reliability is achieved.

In accordance with the invention, a method is provided for supporting data upload from a mobile gateway device to a backend entity, where data uploading is performed according to an upload schedule, the method including:

reporting, by a plurality of gateway devices, connectivity information of the gateway devices to a connectivity registry entity;

computing, by the connectivity registry entity, connectivity patterns based on the connectivity information;

retrieving, by the mobile gateway device, one or more connectivity patterns for one or more channels that are intended to be used by the mobile gateway device, where, based on location information of the mobile gateway device, the one or more connectivity patterns retrieved by the mobile gateway device are selected from the connectivity patterns computed by the connectivity registry entity; and determining, by the mobile gateway device, a preemptive upload schedule for uploading data from the mobile gateway device to the backend entity such that the preemptive upload schedule is adjusted based on the one or more connectivity patterns retrieved by the mobile gateway device from the connectivity registry entity.

Furthermore, a system for supporting data upload from a mobile gateway device to a backend entity is provided, where data uploading is performed according to an upload schedule, the system including:

a connectivity registry entity and a plurality of gateway devices including at least one mobile gateway device, where the gateway devices are configured to report connectivity information to the connectivity registry entity, where the connectivity registry entity is configured to compute connectivity patterns based on the connectivity information, where the mobile gateway device is configured to retrieve one or more connectivity patterns for one or more channels that are intended to be used by the mobile gateway device according to location information of the mobile gateway device, and where the mobile gateway device is further configured to determine a preemptive upload schedule for uploading data to the backend entity such that the preemptive upload schedule is adjusted based on the one or more connectivity patterns retrieved by the mobile gateway device from the connectivity registry entity.

According to the invention it has first been recognized that, with regard to efficiency and reliability, an enormous improvement for data uploading from a mobile gateway device to a backend entity may be achieved by having knowledge about future connectivity characteristics such as future connectivity levels of the mobile gateway device. For this purpose, according to the invention, a plurality of gateway devices report connectivity information to a connectivity registry entity. The gateway devices may be stationary and/or mobile gateway devices. Based on the connectivity information reported by the gateway devices, the connectivity registry entity computes connectivity patterns. According to the invention one or more connectivity patterns for one or more channels that are intended to be used by the mobile gateway device are requested/retrieved by the mobile gateway device, where, based on location information that is provided by the mobile gateway device, the one or more connectivity patterns requested/retrieved by the mobile gateway device are selected from the connectivity patterns computed by the connectivity registry entity. The mobile gateway device determines a preemptive upload schedule for uploading data, i.e. data items, from the mobile gateway device to the backend entity in such a way that the preemptive upload schedule is adjusted and controlled in consideration of the one or more connectivity patterns retrieved by the mobile gateway device from the connectivity registry entity.

Thus, based on the connectivity patterns, a preemptive upload is provided and adjusted such that connectivity information dependent on the location information of the mobile gateway device, such as its current and future position, can be considered for the execution of the data upload. Hence, a method and system according to the invention improves data uploading from a mobile gateway device to a backend entity with regard to efficiency and reliability.

The term "upload schedule" may refer in particular in the claims, preferably in the description, to a schedule and/or policy for scheduling and controlling the execution of the data upload. The upload schedule may be implemented by software functionality such as a program and/or a configuration file. For gateway devices, data uploading schedules may be an alternative to "immediate uploading/forwarding" of the data that they generate, capture, monitor or collect from devices which are connected to them and which generates data that is to be uploaded. Furthermore, when no real-time requirements exist, it may be often preferred to cache the data for longer periods, e.g. various seconds or even minutes or hours, and upload the entire cache content at once, for instance periodically. Depending on the system and the use case, this can have advantages such as fair or more efficient bandwidth usage, reduction of open connections to backend systems, and more.

The term "preemptive upload schedule" may refer in particular in the claims, preferably in the description, to a preemptive schedule and/or preemptive policy for scheduling and controlling the execution of data upload, where the preemptive schedule enables one or more options and/or operations for performing preemptive data upload.

The term "backend entity" may refer in particular in the claims, preferably in the description, to an entity that is located in the backend of a network and, thus, remotely from a client and/or from a gateway device at the edge of the network. The backend entity may be a data center, a cloud system, a backend system and/or database, etc., including a data storage in which data collected by gateway devices that are located at the edge of the network can be stored.

The term "connectivity registry entity" refers in particular in the claims, preferably in the description, to a connectivity registry entity that may include a server and/or database system being configured to receive and/or manage connectivity information provided by gateway devices in order to compute connectivity patterns. These connectivity patterns may be queried by a gateway device, preferably by a mobile gate device.

The term "connectivity pattern" may refer in particular in the claims, preferably in the description, to a pattern that may provide information about expected channel qualities and connectivity characteristics for a predetermined area/location. The connectivity patterns may additionally have a duration for which they are valid, i.e. a period of validity.

According to embodiments of the invention, the connectivity information reported by the gateway devices may include channel quality information about channels that are used by the gateway devices. Thus, the connectivity registry entity gets connectivity information about available access channels of the network by receiving reports from a plurality of gateway devices. Advantageously, connectivity reports from a big number of gateway devices might be available in order to generate and compute really informative and exploitable connectivity patterns by the connectivity registry entity. For example, the connectivity information may include connectivity logs generated by connectivity logging from the gateway devices.

According to embodiments of the invention, the connectivity information reported by the gateway devices may include location information and/or time information. Thus, the connectivity information about channels is advantageously coupled with location and/or time such that connectivity information may be obtained dependent on location and/or time.

According to embodiments of the invention, the connectivity patterns computed by the connectivity registry entity may be further based on network planning information that is received from a network controller. For instance, the network controller may be configured to apply programmable logic on routing, slicing and/or configuration settings of channels that are available for gateway devices. The network controller may be an entity that is configured to provide software functionality in the core of a network, where the network controller can be used by the operator to program and control various aspects of the network. Such aspects may be policies to be applied, e.g. Quality of Service (QoS) policies. Furthermore, such aspects may be routing rules and tables, network slicing (i.e., separating the network and assigning different traffic types to different "slices"), and more. For example, the network operator might program the network controller to "increase the bandwidth that is assigned to Subscriber X, Protocol Y or Application Z at 6 pm" or to "enable that a predetermined action is performed periodically at predetermined time intervals", and more. Another example would be to "re-direct all video traffic to a dedicated network slice".

Furthermore, the term "network planning information" may refer in particular in the claims, preferably in the description, to information preferably provided by the network controller about planned actions which the network controller is aware of and/or which the network controller knows it is going to enforce, e.g., because the network controller has already been programmed to enforce them.

According to embodiments of the invention, the network controller may be implemented in the form of a SDN (Software-defined networking) controller.

Furthermore, it may be provided that the network controller is just implemented as an entity being adapted to "talk" to a PCRF (Policy and Charging Rules Function) or it may be provided that the network controller functionality is provided by configuring an eNodeB (E-UTRAN Node B) accordingly.

According to embodiments of the invention, the location information of the mobile gateway device may include future locations of the mobile gateway device. In this regard, it may be provided that location information of the mobile gateway device includes future locations of the mobile gateway device during a predetermined time period for which the mobile gateway device wants to determine the preemptive upload schedule. Thus, the mobile gateway device may request and/or retrieve connectivity patterns according to its location and movement, in particular that is intended in the future. In this regard, it is mentioned that various known predictors and/or predictor algorithms might be used and implemented in order to compute future locations of the mobile gateway device at specified times. For example, an Interacting Multiple Model (IMM) algorithm might be used for predicting future locations. Such an algorithm is exemplarily described in the non-patent literature of S. Ikeda, N. Kami and T. Yoshikawa: "*Adaptive mobility management in cellular networks with multiple model-based prediction*", 2013 9th International Wireless Communications and Mobile Computing Conference (IW-CMC), Sardinia, 2013, pp. 473-478. Furthermore, dead reckoning algorithms or any other state-of-the-art prediction algorithms might be employed for predicting future locations of the mobile gateway device.

According to embodiments of the invention, it may be provided that the selection of the one or more connectivity patterns retrieved by the mobile gateway from the connectivity patterns computed by the connectivity registry entity is additionally based on a predetermined time period. Thus, the mobile gateway device may query for one or more connectivity patterns dependent on a predetermined time period for which the mobile wants to determine and adjust the preemptive upload schedule. Hence, the mobile gateway device may query the connectivity registry entity for connectivity patterns per a geographic area and/or per a time period as time information. The time period/information may represent a planning horizon. To this extent, for example, the planning horizon might be specified in milliseconds. Advantageously, a connectivity pattern may have a period of validity. For example, if a connectivity pattern CP1 will be valid starting from tomorrow, but the time information or rather the planning horizon for which the preemptive upload schedule has to be determined and based on which the connectivity patterns are retrieved is set to 3 hours, then CP1 is not going to be returned from the connectivity registry entity to the requesting mobile gateway device. The functionality implemented in the connectivity registry entity may return a list of connectivity patterns which will be valid in the specified area at some point in time within the specified planning horizon period.

According to embodiments of the invention, the preemptive upload schedule may be adjusted by taking into consideration of an amount of expected bad connectivity situations according to location and/or movement of the mobile gateway device. Advantageously, it may be provided that the preemptive upload schedule is adjusted in such a way that upload intervals are increased and/or additional upload events are introduced, when the amount of expected bad connectivity situations is above a predetermined threshold. Thus, violations of possible application requirements in terms of data upload delays may be reduced and/or avoided.

According to embodiments of the invention, the one or more connectivity patterns retrieved by the mobile gateway device may include an area and a channel quality indicator. The channel quality indicator may have several levels, where these levels may also include a level that indicates "no connectivity" or rather "out of range". Thus, the mobile gateway device can obtain information about connectivity qualities and/or connectivity characteristics for a specific area. Furthermore, this information may also include a specific period of validity for which this connectivity qualities and/or characteristics are to be valid. Thus, the channel quality indicator may be represented by a value that can be interpreted directly as a quality of the connection at given time.

According to embodiments of the invention, the one or more connectivity patterns retrieved by the mobile gateway device may further include a confidence level for the channel quality indicator. Thus, by the use of the confidence level, a probability that an indicated channel quality will still exist in the corresponding area in the future may be provided. For example, if the channel quality indicator of a given connectivity pattern is based on network planning information, i.e. for instance a programmed network controller action, then the confidence level value may be set to maximum. If the channel quality indicator of a given connectivity pattern is based on reports of other gateway devices about "bad connectivity", then a function for computing the confidence level may be implemented, e.g., based on how many gateway devices reported this connectivity information and how "fresh" (time-wise) their reports are.

According to embodiments of the invention it may be provided that, for adjusting the preemptive upload schedule, only those of the one or more connectivity patterns retrieved by the mobile gateway are considered which have a consideration probability that is above a predetermined minimum probability threshold. Thus, a configuration parameter may be provided by the use of the minimum probability threshold, where the configuration parameter can indicate the minimum probability that a connectivity pattern must have in order to be considered. Hence, improbable and unsuitable connectivity patterns can be effectively disregarded.

According to embodiments of the invention, the consideration probability of a connectivity pattern may be based on a probability that the mobile gateway device enters the area of the connectivity pattern and/or may be based on the confidence level of the connectivity pattern. Thus, improbable connectivity patterns may be disregarded in a simple and effective way.

According to embodiments of the invention, the preemptive upload schedule may be adjusted by adapting upload intervals and/or by performing one or more additional upload events. For example, the upload intervals can be increased in order to timely upload data before losing connectivity. Thus, data freshness violations can be reduced, i.e. situations in which important data collected by IoT gateway devices is uploaded/reported too late to the backend entity.

According to embodiments of the invention, the preemptive upload schedule may be adjusted in such a way that system usage and a number of violations of application requirements in terms of data upload delays are jointly optimized. In this regard, the system usage may consider bandwidth usage, energy consumption of the mobile gateway device and/or a total number of connections from the mobile gateway device to the backend entity. Thus, the preemptive upload schedule may be generated based on a logic which inserts additional upload events into the data upload schedule of the mobile gateway device and/or may adjust the data upload intervals within the data upload schedule, e.g., in a way that jointly optimizes the system usage (total number of connections to the backend, fair bandwidth usage, GW energy consumption) and the number of violations of application requirements in terms of data upload delays.

According to embodiments of the invention, the system for supporting data upload from a mobile gateway device to a backend entity may additionally include a network controller for enforcing network control actions, where the network controller includes an interface that is configured to be queried by the connectivity registry entity about network planning information, in particular about future network control actions.

The network controller may be a software function in the core of the network, which is used by the operator to program various aspects of the network. Such aspects can be (QoS) policies to be applied, routing rules and tables, network slicing (i.e., separating the network and assigning different traffic types to different "slices"), and more. For example, the operator can program the NC to "increase the bandwidth that is assigned to Subscriber X, Protocol Y, or Application Z at 6 pm or every time XXX happens, etc.". Another example would be to "re-direct all video traffic to a dedicated network slice".

Furthermore, it may be provided that the connectivity registry entity is further configured to compute the connectivity patterns additionally based on the network planning information that is received from the network controller. Thus, according to an embodiment of the invention a method or a system for scheduling the uploading of data items of mobile gateway devices may be provided, where the scheduling is based on combined connectivity-related information from other devices, network controllers and location prediction modules, where the location prediction module are preferably placed on the mobile gateway devices.

According to embodiments of the invention it may be provided that a network controller and the information it provides is integrated into the data management lifecycle by extending the network controller's application programming interface (API) in order to accept queries about future network control actions.

According to embodiments of the invention it may be provided that "programmed" (i.e., future, obtained from network controller) and "monitored" (i.e., past, obtained from gateway devices) channel information is combined for building connectivity patterns which are used by the mobile gateway devices in order to determine a preemptive upload schedule, where the preemptive upload schedule can be adjusted by inserting additional upload events (e.g., before losing connectivity) and/or by adjusting the data upload intervals.

At least one embodiment of the present invention may have one or more of the following advantages:

Data freshness violations can be reduced, i.e. situations in which important data collected by mobile IoT gateway devices is uploaded/reported too late to a backend system. This can be an asset for many applications.

Congestion of low-bandwidth access channels can be reduced by scheduling most of the data uploads to take place in good connectivity periods, i.e., eventually letting most of the total communication flow through high-bandwidth channels.

The number of concurrent connections to a backend system or database can be reduced, thus reducing the probability of crashes.

There are several ways how to design and further develop the teaching of the present invention in an advantageous way. To this end it is to be referred to the patent claims and to the following explanation of example embodiments of the invention, illustrated by the figures. In connection with the explanation of the example embodiments of the invention by the aid of the figures, generally further embodiments and further developments of the teaching will be explained.

FIG. 1 shows an application scenario in the field of the Internet of Things (IoT) for a method and a system according to an embodiment of the present invention. FIG. 1 shows in the backend 1 a backend entity such as a data center or a cloud system, which is directly coupled to the network core 2. Connections within the network core 2 and the connection to the backend entity in the backend 1 are provided by a fixed access. Connections of IoT devices—i.e. things 3 such as sensors, data sources, cameras, smartphones, etc.—to the network are provided by gateway devices at the edge 4 of the network. The gateway devices, in particular mobile gateway devices 5 such as cars, drones, trains, etc., can be connected to the network by wireless access. The mobile gateway devices 5 have a data cache C for storing data that the mobile gateway devices 5 generate, capture, monitor and/or collect from devices, i.e. things 3, preferably sensor devices, which are connected to the mobile gateway devices 5. The data stored in the data cache C is uploaded via one of the available access channels according to an upload schedule plan.

Figure 2:
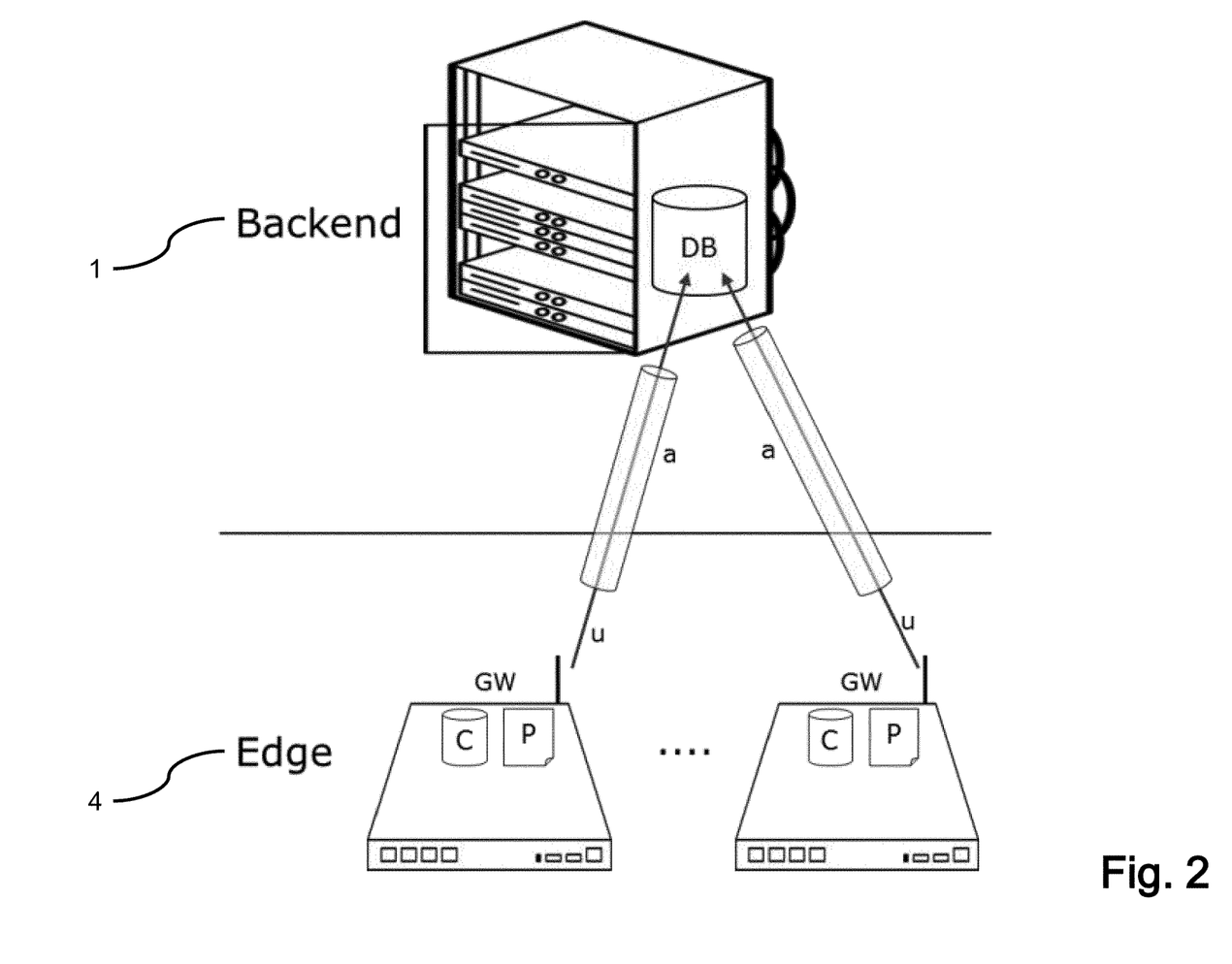
FIG. 2 is a schematic view illustrating an example of a data upload scheduling system.

FIG. 2 shows an example of a generic data upload scheduling system which can be adapted in order to provide a method and a system according to an embodiment of the present invention. Specifically, FIG. 2 shows entities with functionalities that may be involved in a data upload scheduling system as follows:

Database (DB): Database DB located in the backend 1 is a remote data storage medium in which data collected and/or provided by various gateways GW is stored.

Gateway (GW): A Gateway GW is a gateway device, preferably a mobile gateway device, at the edge 4 of a network, where the gateway GW collects data from data sources and has connectivity to the remote database DB being the remote data storage medium located in the backend 1.

Cache (C): Cache C of a gateway GW is a local data storage in which the data collected by the gateway GW is written/stored before being written/stored into the remote database DB in the backend 1.

Policy (P): Policy P as upload schedule represents a software functionality of a gateway GW, e.g. a program or a configuration file, which determines when and how the data from the cache C is written into the remote database DB in the backend 1. The two extreme cases of the policy P correspond with either immediately uploading every data item to the database DB or with storing everything only locally into the cache C. Both of them, as well as every solution between them can have advantages and disadvantages based on the system status and the use case.

Uploaded Data (u): Uploaded data u represents data going from a gateway GW via an access channel "a" to the remote database DB in the backend 1 according to the policy P of the gateway GW.

Channel (a): Channel "a" is an access channel that provides the network connection which is dynamically selected based on the policy P for transmitting the uploaded data u to the database DB in the backend 1.

Figure 3:
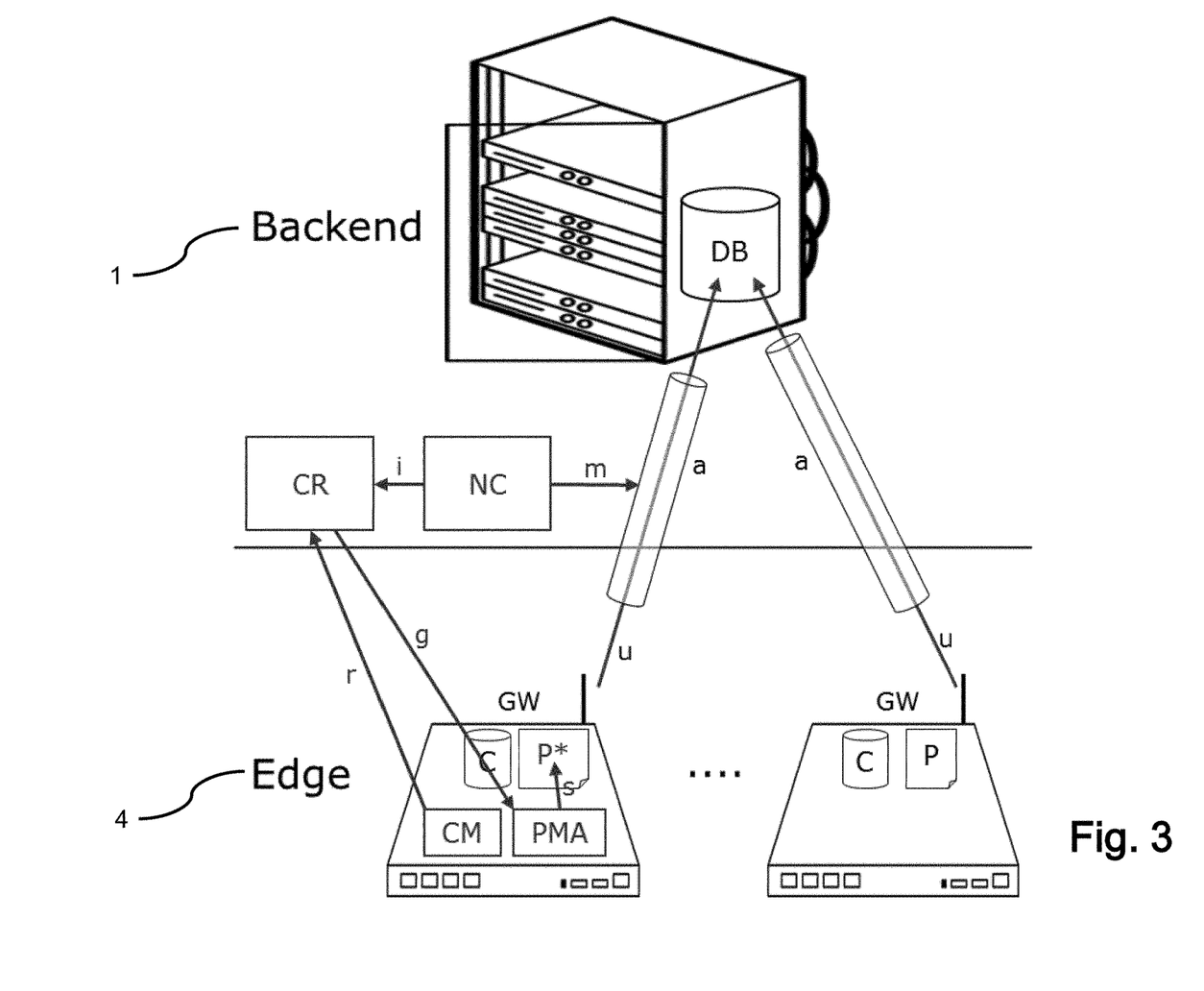
FIG. 3 is a schematic view illustrating a method and a system according to an embodiment of the present invention.

FIG. 3 shows a method and a system according to an embodiment of the present invention, where a data uploading approach for network-aware and collaborative schedules based on connectivity patterns is provided. The embodiment of FIG. 3 provides an extension of the data upload scheduling system illustrated by FIG. 2. Specifically, the embodiment of FIG. 3 enables network-aware collaborative pre-emptive uploads based on connectivity patterns of mobile IoT gateways and advanced network planning information.

The entities and modules required for this extension and the operations they implement are shown in FIG. 3 and described in the following, assuming that the rest of the modules and entities function as described in the generic setting of FIG. 2:

Network Controller (NC): Network controller NC is a server which applies programmable logic on routing, slicing and configuration aspects of the channels a. For example, the network controller may be a SDN controller as specified by the Open Networking Foundation which is retrievable at https://www.opennetworking.org/images/stories/downloads/sdn-resources/technical-reports/SDN-architecture-overview-1.0.pdf Connectivity Registry (CR): Connectivity registry entity CR is a server which retrieves network planning information from the network controller NC and monitored connectivity levels from the gateways GW and computes connectivity patterns which provides expected channel qualities and which can be queried by area and/or time.

Connectivity Monitor (CM): Connectivity monitor CM is a module of a gateway GW which reports outages and other link quality information of the channels that are used by the GW.

Pattern and Movement Analyzer (PMA): Pattern and movement analyzer PMA is module of a gateway GW which retrieves from the connectivity registry entity CR connectivity patterns about channels that the gateway GW might need to use according to its location and movement information.

Preemptive Policy (P*): Preemptive Policy P* as preemptive upload schedule represents the software functionality of the gateway GW like P of FIG. 2, but including options for preemptive upload planning algorithms.

m: Channel modification (e.g., rate, QoS-level) by the network controller NC.

i: Sending of information from the network controller NC to the connectivity registry CR about network control actions which are programmed to be enforced by network controller NC on channel "a". This requires an extension of the network controller NC interface so that the network controller NC accepts queries about network planning information including information about future network control actions.

r: Reporting of monitored connectivity and channel qualities from the gateway GW.

g: Getting connectivity patterns. A gateway GW does not receive raw reports of other gateways, but connectivity patterns which are relevant for it (based on its possible future locations) and have been prepared based on reports from different other gateways, as well as information from the network controller NC.

s: Setting of policies for preemptive data uploads (for instance according to the exemplary logic of the algorithm illustrated by FIG. 4), thus determining and adjusting a preemptive upload schedule.

The embodiment of FIG. 3 may also use GW-to-GW communication for the "r" and "g" messages. For example, instead of "r" messages, gateways GW may collect connectivity information from other nearby gateways GW and upload them to the connectivity registry entity CR (as soon as they have connectivity to it) on their behalf. Similarly (for "g" messages), a gateway GW might forward connectivity patterns that it has downloaded from the connectivity registry entity CR to nearby gateways GW (which have potentially worse connectivity).

Some important elements of the logic for setting preemptive data upload policies may be the following, where the mentioned predictions are based on movement analysis and reports of other gateways:

Predicting whether an area of "long-lasting bad connectivity" might be entered,

Uploading data before entering such areas, and/or

Scheduling upload intervals based on predicted channel qualities.

FIG. 4 shows a pseudocode listing of an example of a computation algorithm for a method and a system according to an embodiment of the present invention, where the computation algorithm computes a preemptive upload schedule. Additionally to the annotation given in the pseudocode listing of FIG. 4, the following describes further details of the algorithm according to the embodiment illustrated by FIG. 4:

The first if-statement (reference sign 6) computes future locations of the mobile gateway device.

The function "getCPEntriesByArea" of FIG. 4 gets as input a Geofence (see corresponding struct definition in FIG. 4), which practically just defines a geographic area, and a "planningHorizon", e.g. in milliseconds (note: each Connectivity Pattern can have a duration, e.g., if a connectivity pattern CP1 will be valid starting from tomorrow but the planning horizon of the getCPEntriesByArea invocation is set to 3 hours, then CP1 is not going to be returned). The function returns a list of connectivity patterns which will be valid in the specified area at some point in time the specified "planning horizon".

The function "addScheduledUpload" adds an entry into policy P*. This function takes as input a "dateTime" object (which is returned by the function "getTimeOfEnteringArea" being a subfunction of a Geofence struct), and simply puts it into P*, so that the gateway will perform an upload at this point in time.

The second if-statement (reference sign 7) with regard to the "badChannelsThreshold" can be expressed as "If there are too many connectivity patterns ahead "in your way", then increase the periodic interval in order to stop wasting resources and failing all the time; and set an option for uploading only high priority data items.

This statement assumes that "too many connectivity patterns" are regarded as "bad/dangerous thing" in this exemplary implementation. However, connectivity patterns might also be sometimes positive, too. Thus, the condition may also be changed to say "too many bad connectivity patterns" instead of "too many connectivity patterns". Generally, it is to be mentioned that according to embodiments of the invention the connectivity patterns can be retrieved by the mobile gateway device from the connectivity registry entity CR regardless of whether the transmitted connectivity patterns concern bad or good situations.

Figure 5:
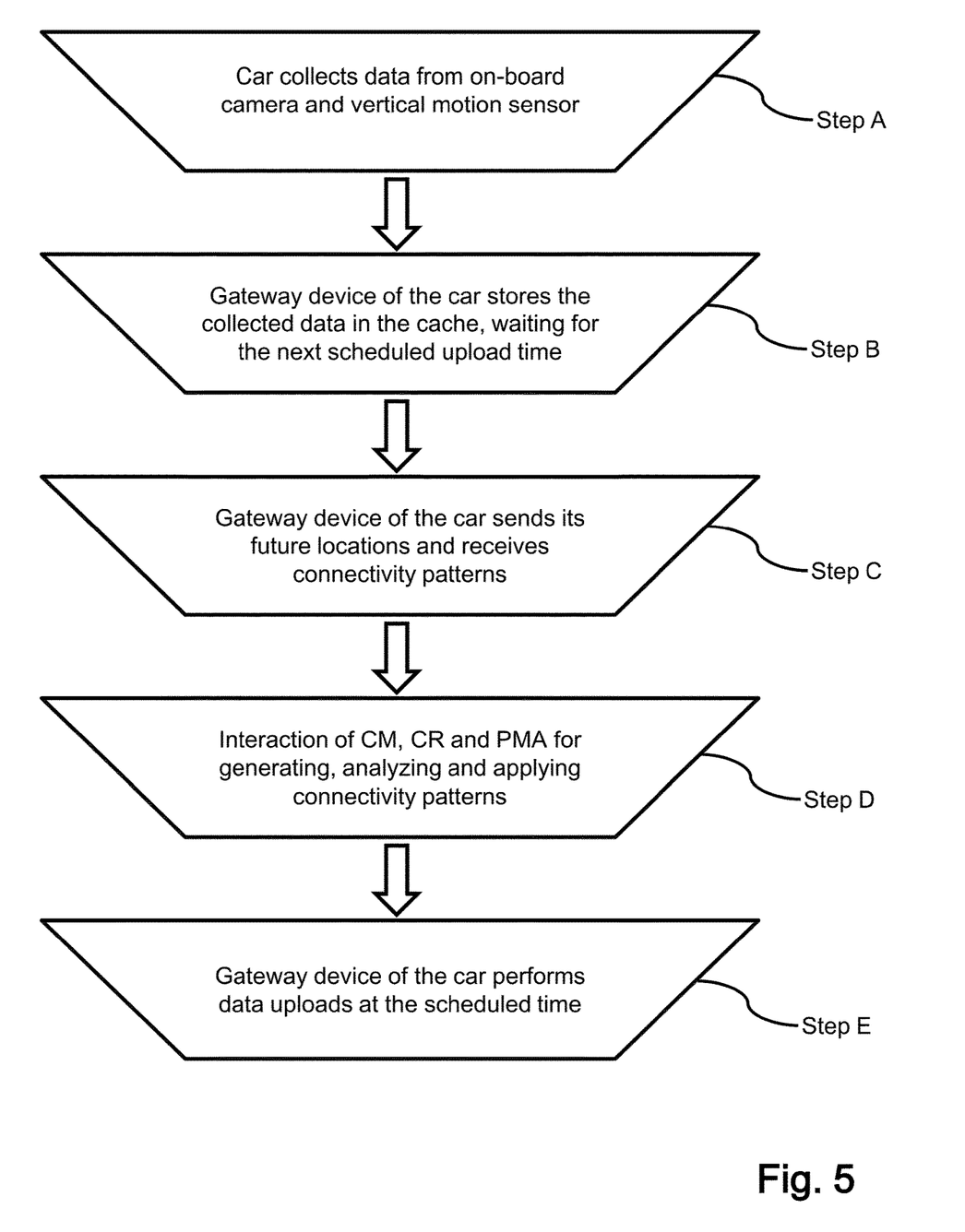
FIG. 5 is a flowchart illustrating an application scenario for a method and a system according to an embodiment of the present invention in the context of intelligent transport systems (ITS).

FIG. 5 is a flowchart illustrating an application scenario for a method and a system according to an embodiment of the present invention in the context of intelligent transport systems. For example, an implementation that is based on the computation algorithm of FIG. 4 might be used for the application scenario of FIG. 5. In the following, the steps of the embodiment of FIG. 5 and technical advantages of the embodiment compared with state-of-the-art approaches such as "immediate uploading" and "simple channel-quality-based decision" are described.

The embodiment illustrated by FIG. 5 includes the following steps:

Step A: A car collects data from an on-board camera and a vertical motion sensor, e.g., in order to support a central application for road obstacles detection and action planning.

Step B: A mobile gateway device of the car stores the data in its cache and is waiting for the next scheduled upload interval in order to flush the cache or a part of it into the database of a backend system.

Step C: The mobile gateway device of the car sends future locations of the car to the connectivity registry entity and gets connectivity patterns from the connectivity registry entity.

The mobile gateway device receives only connectivity patterns that relates to movement of the car or rather of the mobile gateway device.

Each connectivity pattern includes channel quality indicators, i.e. channel quality levels, for a corresponding period of validity and their probabilities which are analogous to the number of other gateway devices' "broken link" reports.

Step D: The interaction of gateway devices' connectivity monitor module CM, the connectivity registry entity CR of the core network and the mobile gateway device's pattern and movement analyzer module PMA generates, analyzes and applies connectivity patterns such that, for instance:

an upload event can be added into the preemptive upload schedule provided by the software functionality P* shortly before losing connectivity, if uploading upon re-connection violates application delay requirements, and/or the upload interval can be increased, if too many uploads are expected to fail.

Step E: The mobile gateway device of the car performs data uploads at the scheduled time, sending only or firstly the high-priority data items, if the connectivity predicted by available connectivity patterns does not suffice for uploading the entire cache to the backend entity.

Comparing step B of the embodiment of FIG. 5 versus "immediate uploading":

Immediate uploading keeps the wireless interfaces of the mobile gateway devices busy at all times. This can impact energy and CPU consumption. Furthermore, many (mobile) gateway devices might collectively crash the backend entity due to I/O throughput.

Comparing step B of the embodiment of FIG. 5 versus "simple channel-quality-based decision", where "simple channel-quality-based decision" means batch data uploads upon detection of good connectivity:

Both approaches have similar behavior, but in case of "always" good connectivity, the embodiment of FIG. 5 avoids connecting too frequently to the backend entity, which can be an issue of a limited number of connections that are allowed, e.g. with regard to I/O throughput.

Comparing step C of the embodiment of FIG. 5 versus "immediate uploading":

The extended mobile gateway device of the embodiment receives information about future connectivity with insignificant additional communication, because the volume and the frequency of the data exchange between the mobile gateway device and the connectivity registry entity is much less than for the regular data uploads.

Comparing step C of the embodiment of FIG. 5 versus "simple channel-quality-based decision":

As above the extended mobile gateway device of the embodiment receives information about future connectivity with insignificant additional communication, because the volume and the frequency of the data exchange between the mobile gateway device and the connectivity registry entity is much less than for the regular data uploads.

Comparing step D of the embodiment of FIG. 5 versus "immediate uploading":

The embodiment of FIG. 5 avoids using bad connections, thus being fair to other gateways, which will need to use the same channels more urgently.

Comparing step D of the embodiment of FIG. 5 versus "simple channel-quality-based decision":

The embodiment of FIG. 5 will have fewer violations of application delay requirements than an "simple channel-quality-based decision" approach that is ignorant of future connectivity.

A very similar sequence of actions with an almost identical set of technical advantages may take place in the cases where drones act as mobile IoT gateways instead of cars. Compared to the embodiment of FIG. 5 the following differences would apply:

The target application might be wide area (e.g., forest or farms) monitoring, instead of road maintenance.

Drones would probably be much more affected by the energy consumed by the communication interfaces, because they usually use batteries that cannot be charged easily. In the case of "quadcopter drones", the energy used for communication could be negligible compared to the energy used for communication, but for "airplane drones" communication energy consumption could be critical.

Drones usually have a "programmed trajectory" which could be used instead of probabilistically predicted future locations of cars. This may imply additional interactions with a drone module that stores this trajectory. Furthermore, this may imply a higher degree of confidence with regard to predicting bad connectivity periods.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting data upload from a mobile gateway device to a backend, wherein the data upload is performed according to an upload schedule, the method comprising:

reporting, by a plurality of gateway devices, connectivity information of the gateway devices to a connectivity registry;

computing, by the connectivity registry, connectivity patterns based on the connectivity information;

retrieving, by the mobile gateway device of the gateway devices, one or more of the connectivity patterns for one or more channels that are configured to be used by the mobile gateway device, wherein, based on location information of the mobile gateway device, the one or more connectivity patterns retrieved by the mobile gateway device are selected from the connectivity patterns computed by the connectivity registry; and determining, by the mobile gateway device, a preemptive upload schedule for uploading data from the mobile gateway device to the backend such that the preemptive upload schedule is adjusted based on the one or more connectivity patterns retrieved by the mobile gateway device from the connectivity registry.

2. The method according to claim 1, wherein the connectivity information reported by the gateway devices includes channel quality information about channels that are used by the gateway devices.

3. The method according to claim 1, wherein the connectivity information reported by the gateway devices includes location information and/or time information.

4. The method according to claim 1, wherein the connectivity patterns computed by the connectivity registry are further based on network planning information that is received from a network controller.

5. The method according to claim 1, wherein the location information of the mobile gateway device includes future locations of the mobile gateway device.

6. The method according to claim 1, wherein, additionally based on a predetermined time period, the one or more connectivity patterns retrieved by the mobile gateway are selected from the connectivity patterns computed by the connectivity registry.

7. The method according to claim 1, wherein the preemptive upload schedule is adjusted by taking into consideration of an amount of expected bad connectivity situations according to a location and/or a movement of the mobile gateway device.

8. The method according to claim 1, wherein the one or more connectivity patterns retrieved by the mobile gateway device include an area and a channel quality indicator.

9. The method according to claim 8, wherein the one or more connectivity patterns retrieved by the mobile gateway device further include a confidence level for the channel quality indicator.

10. The method according to claim 1, wherein only the one or more connectivity patterns that are retrieved by the mobile gateway are considered for adjusting the preemptive upload schedule which have a consideration probability that is above a predetermined minimum probability threshold.

11. The method according to claim 10, wherein the consideration probability of a connectivity pattern of the connectivity patterns depends on a probability that the mobile gateway device enters the area of the connectivity pattern and/or on a confidence level of the connectivity pattern.

12. The method according to claim 1, wherein the preemptive upload schedule is adjusted by adapting upload intervals and/or by performing one or more additional upload events.

13. The method according to claim 1, wherein the preemptive upload schedule is adjusted such that system usage and a number of violations of application requirements in terms of data upload delays are jointly optimized.

14. A system for supporting data upload from a mobile gateway device to a backend, wherein the data upload is performed according to an upload schedule, the system comprising:
a connectivity registry; and
a plurality of gateway devices comprising the mobile gateway device,
wherein the mobile gateway device is configured to report connectivity information to the connectivity registry,
wherein the connectivity registry is configured to compute connectivity patterns based on the connectivity information,
wherein the mobile gateway device is configured to retrieve one or more of the connectivity patterns for one or more channels that are configured to be used by the mobile gateway device according to location information of the mobile gateway device, and
wherein the mobile gateway device is further configured to determine a preemptive upload schedule for uploading data to the backend such that the preemptive upload schedule is adjusted based on the one or more connectivity patterns retrieved by the mobile gateway device from the connectivity registry.

15. The system according to claim 14, additionally comprising:
a network controller configured to enforce network control actions, wherein the network controller comprises an interface that is configured to be queried by the connectivity registry about network planning information; and
wherein the connectivity registry is further configured to compute the connectivity patterns additionally based on the network planning information that is received from the network controller.

16. The method according to claim 4, wherein the network controller is configured to apply programmable logic on routing, slicing and/or configuration settings of channels that are available for gateway devices.

17. The method according to claim 5, wherein the location information of the mobile gateway device includes the future locations of the mobile gateway device, during a predetermined time period for which the mobile gateway device determines the preemptive upload schedule.

18. The method according to claim 7, wherein the preemptive upload schedule is adjusted in such a way that upload intervals are increased and/or additional upload events are introduced if the amount of expected bad connectivity situations is above a predetermined threshold.

19. The method according to claim 13, wherein the system usage considers bandwidth usage, energy consumption of the mobile gateway device and/or a total number of connections from the mobile gateway device to the backend.

20. The system according to claim 15, wherein the network planning information comprises future network control actions.

* * * * *